United States Patent [19]

Buben et al.

[11] 3,862,257

[45] Jan. 21, 1975

[54] MODIFIED ZIEGLER CATALYST FOR ALPHA OLEFIN WAX SYNTHESIS

[75] Inventors: David Buben; Roby Bearden, Jr., both of Baton Rouge, La.; Harry Jan Wristers, Baytown, Tex.

[73] Assignee: Esso Research and Engineering Company, Linden, N.J.

[22] Filed: Apr. 17, 1972

[21] Appl. No.: 244,888

[52] U.S. Cl................. 260/683.15 D, 252/429 B, 260/94.9 CA, 260/94.9 CD
[51] Int. Cl............................................. C07c 3/10
[58] Field of Search........................... 260/683.15 D

[56] References Cited
UNITED STATES PATENTS

| | | | |
|---|---|---|---|
| 3,108,145 | 10/1963 | Antonsen.................. | 260/683.15 D |
| 3,168,588 | 2/1965 | White et al................ | 260/683.15 D |
| 3,576,902 | 4/1971 | Bearden et al............. | 260/683.15 D |
| 3,647,912 | 3/1972 | Langer....................... | 260/683.15 D |
| 3,652,705 | 3/1972 | Arakawa et al............ | 260/683.15 D |
| 3,660,518 | 5/1972 | Cull et al................... | 260/683.15 D |
| 3,660,519 | 5/1972 | Arakawa et al............ | 260/683.15 D |
| 3,725,497 | 4/1973 | Arakawa et al............ | 260/683.15 D |

*Primary Examiner*—Paul M. Coughlan, Jr.
*Attorney, Agent, or Firm*—John Paul Corcoran

[57] ABSTRACT

In a process for preparing a product of linear alpha olefins having a number average molecular weight ranging from about 70 to about 600, wherein an ethylene-containing gas is polymerized in the presence of a substantially soluble catalyst system formed by mixing components comprising a Group IV-B metal compound with an aluminum alkyl compound such that the ultimate formula of the aluminum alkyl compound is $AlR_nX'_{3-n}$ wherein R is one selected from the group consisting of alkyl, aralkyl and cycloalkyl and X' is one selected from the group consisting of chlorine, bromine and iodine and $n$ is an integer less than 2, in the presence of a nonpolar diluent and at a temperature less than 75°C. and a pressure above 100 psig wherein the mole ratio of ethylene to the reaction product is maintained above 0.8 throughout the reaction and a reaction product is prepared having at least 90 mole percent linear olefins in which the product olefin concentration is greater than 5 weight percent based on the diluent and reaction product, the improvement therewith of adding to the catalytic mixture at least 10 mole percent of a modifier, based on moles of a Group IV-B metal compound, said modifier being a polyfunctional Lewis Base capable of forming complexes with $AlCl_3$ which are substantially insoluble in nonpolar polymerization diluents whereby the selectivity of the catalyst is greatly enhanced for the formation of linear alpha olefins of number average molecular weight in the range of 240–600.

6 Claims, No Drawings

MODIFIED ZIEGLER CATALYST FOR ALPHA OLEFIN WAX SYNTHESIS

Naturally occurring specialty waxes of which the microcrystalline waxes are representative are greatly valued for their hardness, luster and high melting points which range, e.g., from about 170°F. to 250°F. These waxes, used primarily as additive waxes to bolster the properties of the lower melting paraffin waxes, enjoy a large and growing market. However, it is doubtful that the current sources of these specialty waxes, i.e., crude oil stocks are completely adequate and will thus put the microcrystalline waxes in short supply.

This same situation exists, perhaps to an even larger degree, for the naturally occurring animal and vegetable waxes, e.g., beeswax and Carnauba wax, which are widely used in polishing wax formulations. These waxes differ primarily from the microcrystalline or mineral waxes in that they contain functional groups, e.g., hydroxyl or carboxylic acid groups. The need for synthetic mineral, animal and vegetable waxes is clearly indicated.

It was recognized that some oligomers of linear alpha olefins have properties which make them quite desirable as waxes. The polymerization of ethylene to linear alpha olefins in the $C_{22}$–$C_{200}$ range would provide an excellent source of high melting mineral waxes. Moreover, these olefin waxes would be ideal raw materials for the synthesis of the functionally substituted animal and vegetable waxes. The feasibility of a process based on polymerization of ethylene for producing such olefins, however, was in doubt.

Traditionally, ethylene is polymerized at selective conditions in the presence of catalytic complexes formed from mixtures consisting of transition metal halide, aluminum halides and organoaluminum compounds to yield various products. High molecular weight, high density polymers are formed in the presence of these insoluble Ziegler type catalyst complexes produced, e.g., by reaction between titanium tetrachloride, aluminum chloride, and aluminum triethyl. A characteristic of such reactions is that in the formation of the resultant insoluble catalytic complex the titanium metal is reduced to a metal having a valence of three or below.

Oligomers, which have entirely different properties due in part, to the very limited molecular weight, have also been prepared. The catalyst complexes used for conducting oligomerization reactions are entirely different from the conventional Ziegler catalysts and the reaction apparently proceeds by a different mechanism. For example, whereas average product molecular weight varies inversely with temperature in the reduced titanium system, molecular weight varies directly with temperature for the soluble oligomerization catalyst. The reactants used in the formation of these oligomerization catalyst complexes include transition metal halides and also organoaluminum halide compounds, added together in specified concentrations, to produce a soluble complex wherein the titanium metal of the complex is unreduced.

In forming such oligomerization catalysts, the reactants are premixed in the polymerization diluent at conditions selected to optimize oligomerization catalyst formation, while inhibiting formation of the insoluble Ziegler type catalysts. When ethylene is added to a solution of the oligomerization catalytic complex, at appropriate conditions, $C_4$ to $C_{60}$ oligomers, particularly the $C_4$ to $C_{22}$ oligomers, and especially Type I or linear alpha olefins, are selectively formed in very high concentrations to the exclusion of high molecular weight polymers, Type II (RCH=CHR), Type III ($R_2$C=$CH_2$) and Type IV ($R_2$C=CHR) olefins. This basic concept is disclosed and claimed in U.S. Pat. No. 3,441,630 issued to Langer et al.

The carbon number range attainable with these oligomerization catalyst systems, however, is limited, and the desired $C_{22}$–$C_{200}$ wax range olefins are formed only in moderate amounts even under the most favorable conditions, viz., as when oligomerization is conducted in nonpolar diluents at relatively high temperatures. Unfortunately, as conditions are adjusted to favor formation of the desired oligomers, increasing yields of the undesirable high molecular weight polyethylene are encountered. Such phenomenon has militated against an ethylene oligomerization process for production of wax range olefins.

It is nonetheless the primary objective of the present invention to obviate these and other difficulties and, particularly, to provide a new and improved ethylene oligomerization process for the highly selective formation of reaction product mixtures containing high concentrations of $C_{22}$ to $C_{200}$ linear alpha olefins, especially $C_{40}$ to $C_{100}$ linear alpha olefins.

SUMMARY OF THE INVENTION

Briefly, this invention relates to a process for preparing a product of linear alpha olefins having a number average molecular weight ranging from about 70 to about 600, wherein an ethylene-containing gas is polymerized in the presence of a substantially soluble catalyst system formed by mixing components comprising a Group IV-B compound, said compound being one selected from the group consisting of $MX_m(OR')_{4-m}$, $MX_m(OOCR')_{4-m}$, wherein X is one selected from the group consisting of chlorine and bromine, and R' is one selected from the group consisting of alkyl, aryl, aralkyl and cycloalkyl, M is one selected from the group consisting of Ti, Zr and Hf, $m$ ranges from 0 to 4, and an aluminum alkyl compound such that the ultimate formula of the aluminum alkyl compound is $AlR_nX'_{3-n}$ wherein R is one selected from the group consisting of alkyl, aralkyl, and cycloalkyl and X' is one selected from the group consisting of chlorine, bromine and iodine and n is an integer less than 2, in the presence of a diluent and at a temperature less than 75°C. and a pressure above 100 psig wherein the mole ratio of ethylene to the reaction product is maintained above 0.8 throughout the reaction and a reaction product is prepared having at least 90 mole percent linear olefins in which the product olefin concentration is greater than 5 weight percent based on the diluent and reaction product, further including the step of adding to the catalytic mixture at least 10 mole percent of a modifier based on moles of a Group IV-B metal compound, said modifier being a polyfunctional Lewis Base capable of forming complexes with $AlCl_3$ which are substantially insoluble in nonpolar polymerization diluents whereby the selectivity of the catalyst is greatly enhanced for the formation of linear alpha olefins of number average molecular weight in the range of 240–600.

The catalyst is usually prepared outside of the reactor by treating a solution of $TiCl_4$ in the polymerization diluent with an excess of $AlEtCl_2$, then stirring at ambient temperatures for approximately ten minutes before charging to the reactor and subjecting the catalyst to ethylene under pressure. During the ten minute pretreatment period, the following reaction is thought to occur:

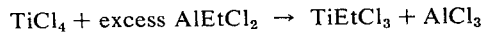

The titanium tetrachloride is alkylated and aluminum chloride is formed. Though insoluble in the nonpolar hydrocarbon diluent the $AlCl_3$ product fails to precipitate. Presumably, it remains in solution coordinated to the active catalyst species. In this regard, it has been shown in U.S. Pat. No. 3,637,897 in the name of Cull, Bearden and Mertzweiller and U.S. Pat. No. 3,655,812 in the name of A. W. Langer, Jr., that strong Lewis Acids such as $AlCl_3$, $AlBr_3$, $FeCl_3$, $SnCl_4$, etc. will coordinate with the catalyst and in so doing effect an increase in catalyst activity and a decrease in the olefin product $\bar{M}n$. Thus, for our purposes, it is desirable to remove the $AlCl_3$ product prior to initiation of polymerization. Surprisingly, it was found that the above-mentioned modifiers are capable of selectively removing aluminum chloride from the catalyst complex. The resultant modifier — $AlCl_3$ complex, substantially insoluble in the polymerization, drops from solution and can be removed. Specific examples are acetyl acetone, hexamethylphosphoric triamide, ethylene glycol dimethyl ether, triethylenediamine.

Any amide, ketone ether and amine fitting the above enumerated criteria would be operable in this invention.

The precipitate which forms on adding the modifier to the catalyst system is preferably retained in the pretreatment flask when the catalyst solution is filtered into the reactor. However, it is to be understood that in preparation of the catalyst, the modifier can be added in suitable concentration to the reactor directly.

The time at which the modifier is added during the catalyst preparation step is not particularly critical. Preferably, it is added to the polymerization diluent after the catalyst components have been mixed and definitely prior to initiation of the ethylene oligomerization reaction.

Suitably, the oligomerization catalyst mixture is separately treated with the modifier for a period ranging from about 5 minutes to about ½ hour, and at a temperature of about 0° to 50°C., preferably about 15°-25°C. The modifier can be added to the oligomerization catalyst mixture, or solvent containing the catalyst mixture, to effect the modification in effective concentrations ranging up to about about 400 mole percent, based on the moles of transition metal halide, preferably from about 10 to 200 mole percent and most preferably from 50 to 150 mole percent.

The modified catalyst is contacted with ethylene at pressures sufficient to maintain a molar ratio of ethylene to product olefins sufficient to suppress copolymerization reaction with the oligomer olefins. The ethylene oligomerization reaction is conducted at temperatures ranging from about 0°C. to about 100°C., and preferably from about 20°C. to about 50°C. pursuant to which conditions the normal alpha olefin carbon range of a product can be shifted from one having an average molecular weight ranging from about 70 to 200 to one ranging from about 200 to about 400 without substantial production of high molecular weight polymers, i.e., molecular weight above about 100,000.

The unmodified catalyst employed in the reaction system is a complex reaction product which is substantially soluble in the polymerization system. The complex is obtained by partially reacting a reducible, heavy transition metal halide, the metallic portion of which is selected from Groups IVB, VIB, and VIII of the Periodic Chart of the Elements, preferably Group IVB with an aluminum alkyl halide compound such that the ultimate formula of the aluminum alkyl compound is $AlR_nX_{3-n}$, wherein $n$ is less than 2 and preferably less than 1, R is alkyl, cycloalkyl or aralkyl, preferably containing from 1 to about 20 carbon atoms, for example, methyl, ethyl, isobutyl, cyclohexyl, benzyl, etc., and X is chlorine, bromine or iodine. The preferred transition metal used in forming the complex is a Group IV-B metal compound having a valency of 4, as represented by the formula: $MX_aA_b$ wherein M is one selected from the group consisting of Zr, Ti and Hf, $a = 3$ or 4, $b = 0$ or 1 and $a + b = 4$, X is chlorine or bromine and A is chlorine, bromine or an anion derived from a protonic compound such as an alcohol ($R'OH$) or a carboxylic acid ($R'COOH$). The $R'$ of the protonic compound can be an alkyl, aryl, aralkyl or cycloalkyl group. The $MX_aA_b$ component can be made in situ by reacting $MX_4$ with the protonic compound. Thus, the preferred transition metal component of this invention may be selected from the groups $MX_4$, $MX_3OR'$ and $MX_3OOCR'$. Typical examples of such compounds are $TiCl_4$, $TiBr_4$, $TiX_3OC_2H_5$ and $TiX_3OOCH_3$, $ZrCl_4$, $ZrBr_4$, $ZrCl$ $(OEt)_3$, $ZrCl_2(OC_{10}H_{21})_2$, $ZrBr_3OBu$, $Zr(OPr)_4$, $Zr(OBu)_4$, $ZrCl_2(O\phi)_2$, $ZrCl_2(OOCC_9H_{19})_2$, $ZrCl(OOC\phi)_3$, $ZrCl_3OOCCH_3$, $ZrCl_2$ glycoxide, Zr acetyl acetonate, $ZrCl_3$ (O-cyclohexyl), $HfCl_4$, $HfBr_4$ and $Hf(OBu)_4$.

The aluminum alkyl halide component is generally of the formula $RAlX_2$ or, in some cases, a mixture of components $RAlX_2$ and $R'R''AlX_2$ wherein R, R' and R'' are similar or dissimilar and thus represent a hydrocarbon radical such as alkyl, cycloalkyl, or aralkyl containing preferably, from 1 to about 20 carbon atoms, and X is a halogen such as chlorine, bromine or iodine.

The molar ratio of alkyl aluminum halide to the transition metal halide in forming the complex is not critical to this invention as long as the $AlR_nX_{3-n}$ reaction product has the proper formula. The ratio can be 0.1/1 to 150/1 or more. Catalyst concentration is normally in the range of 0.1 to 10 grams per liter of diluent.

Ethylene is unique in the instant invention in that other olefins do not respond to give linear alpha olefins. Therefore, it is desirable to use essentially pure ethylene or mixtures of ethylene with inert gases as the feed for the process of this invention. Ethylene feed containing minor amounts of other olefins can be used but it must be realized that the copolymerization will, to some extent, decrease product linearity.

The polymerization diluent is a very important feature of this invention. Nonpolar diluents are preferred, inasmuch as polar solvents undesirably promote a decrease in the average molecular weight of the product. Aliphatic and naphthenic diluents are quite satisfactory and are preferred. They are useful alone or in admixture. Moreover, the liquid ethylene can be used as a solvent. This offers the advantage, in commercial processes, of eliminating the need for solvent recovery systems.

Illustrative of the useful aliphatic solvents are hexane, 2,3-dimethyl butane, 2-methyl-3-ethyl hexane, hexadecane, nonadecane, heptadecane, and industrial mixtures such as kerosene, light naphthas and the like. Suitable naphthenes are cyclohexane, cyclopentane, butylcyclopentane, 1,4-diethylcyclohexane, and the like.

The oligomerization reaction must be conducted at sufficient pressure to avoid the formation of highly branched olefins and to obtain olefins in high selectivities. Although some variations in pressure are permitted, depending upon the catalyst composition, diluent and temperature, the pressure should be maintained above about 100 psig in order to produce commercially attractive yields (at least above 5 weight percent, and preferably above 10 weight percent olefins in the reactor effluent) of linear alpha olefins having a purity greater than about 90 percent. Pressures can range as high as 1000 psig, and higher, but at very high ethylene pressures the process may become uneconomical because of the equipment requirements and ethylene recycle. Preferably, the pressure ranges from about 200 psig to about 600 psig of ethylene pressure.

The ratio of moles of ethylene to the moles of products must be above about 0.8 in order to effect the selective synthesis of ethylene to linear olefins. The preferred molar ratio of ethylene to products is above about 5.0. The upper limit of the mole ratio of ethylene to product must be above 0.8 or the product formed contains more than 10 percent branched chain olefins at product concentrations required to obtain commercially attractive yields.

The process of this invention is carried out at selected conditions of temperatures and pressure which will convert the ethylene to olefin product. Temperature selection permits some control of the average molecular weight of the product. Preferably, the reaction can be carried out at temperatures below about 75°C., but more preferably it is carried out at between about 20°C. and about 50°C.

Reaction times are not particularly critical when operating under the preferred conditions and they will normally be in the range of 0.1 to 5 hours to obtain product concentrations greater than 5 percent by weight in the diluent. The process can be carried out in batch or continuous operation. However, high product purity and high concentration are achieved most easily in batch reactions or in continuous systems operating under essentially plug flow.

The oligomerization reaction is not generally carried to completion, but quenched to terminate the reaction at an optimum desired time. After the catalyst has been effectively quenched, e.g., by adding isopropyl alcohol, the residues can be removed from products in any conventional way, such as washing with water or aqueous caustic, adsorption, ion exchange resins, and the like.

The following illustrative examples, bring out the more salient features of the invention.

EXAMPLE 1

The following describes the experimental procedure used in preparing and modifying the catalyst as well as that used for the oligomerization reaction and product recovery steps.

Catalyst Preparation

Approximately 400 ml of dry n-heptane was charged to a dry, oxygen free 500 ml flask equipped with stirrer and serum cap. In some cases, the catalyst modifier was injected at this point (pre-added) or, alternatively, was added some 4 minutes after the catalyst components were mixed (post-added). The first catalyst component injected was $TiCl_4$, followed by $AlEtCl_2$. The entire mixture was held for a period of 10 minutes (from the point of $AlEtCl_2$ addition) at 25°C. in the absence of light prior to charging to the polymerization reactor. In most cases, the catalyst solution was filtered into the reactor to effect separation from the modifier - $AlCl_3$ precipitate.

Oligomerization

The oligomerization reactions were carried out in a 2-liter Parr autoclave. The contents of the autoclave were precooled to 0°C. prior to charging the catalyst solution. After the catalyst was added, ethylene (dry and oxygen-free) was pressured into the autoclave. The pressure in the autoclave was maintained at 556–600 pounds by adding ethylene as needed. The temperature rose quite rapidly and was maintained at 35° centigrade for 1 hour unless otherwise noted.

A run was terminated by pressuring in isopropanol while the reactor was still under reaction conditions. The quenched product was stirred for approximately 5 minutes and the unreacted ethylene vented off through a Dry Ice trap and wet test meter. After all the ethylene had been vented, the autoclave was weighed prior to disassembly to obtain a yield figure. The autoclave was then disassembled and the total product removed. A sample of the product was analyzed on a G.C. column to obtain product distribution data. The yield of liquid olefins is given in the tabulation below.

Product Workup

The alcohol quenched product was water-washed using two 500 ml. portions of deionized water. After separating off the water, the amount of high molecular weight polyethylene, insoluble in heptane at 90°C. was determined by filtration, air drying and finally drying for 1 hour in a vacuum oven at 125°C. and 26" Hg vacuum. The filtered liquid product (heptane plus ethylene oligomers) was dried and analyzed using capillary G.C. techniques. Product linearity (weight percent linear alpha olefin in $C_{12}$–$C_{20}$ fraction) was determined, and in all instances found to be better than 90 percent. The product average molecular weight ($\bar{M}n$) of the olefins and other product characteristics were determined from the product distribution obtained by gas chromatography.

EXAMPLE 2

The following data relate to catalyst modification with hexamethyl phosphoric triamide (HMDA). This modifier was found to precipitate $AlCl_3$ from the catalyst solution as an off-white waxy solid which was found to contain only trace quantities of the transition metal halide, $TiCl_4$, and of the aluminum alkyl halide, $AlEtCl_2$. In all of the runs cited the $AlCl_3$ modifier precipitate was filtered out of the catalyst solution prior to the oligomerization reaction.

Reference is made to the post-added runs in which HMPA was added after the catalyst components were mixed. Relative to Run 7, no modifier, it is seen that HMPA addition produces a marked increase in the $C_{30+}$ wax olefin yield. It is also noted that the increase in wax yield or product $\bar{M}n$ can be controlled by controlling the amount of HMPA. For example, with 60 mole percent HMPA on $TiCl_4$ (Run 33) the product $\bar{M}n$ is 225 and at 125 mole percent HMPA the product $\bar{M}n$ is 360. However, as the HMPA concentration is in-

TABLE I

INCREASE IN PRODUCT $\bar{M}n$ BY ADDITION OF HMPA MODIFIER

Diluent: 400 ml of n-heptane
Catalyst (Millimoles): $3 TiCl_4 + 16 AlEtCl_2 + HMPA$ (conc. shown)
Oligomerization: 35°C., 650 psig ethylene, 1.0 hr.

| | Post-Added HMPA | | | | | Pre-Added HMPA | | |
|---|---|---|---|---|---|---|---|---|
| Run No. (732-) | 7 | 33 | 27 | 35 | 31 | 25 | 21 | 37 |
| Mole % HMPA (on $TiCl_4$) | 0 | 60 | 100 | 107 | 115 | 125 | 100 | 160 |
| Activity (g. prod./g. $TiCl_4$/hr.) | 135 | 167 | 193 | 144 | 130 | 154 | 124 | 81 |
| Weight % $C_{30+}$ Wax* | 20 | 36 | 44 | 48 | 56 | 63 | 39 | 43 |
| Product $\bar{M}n$ | 181 | 225 | 255 | 274 | 315 | 360 | 236 | 252 |
| Weight % High Polymer | 1.0 | 3.0 | 6.0 | 7.9 | 14.6 | 14.5 | 2.8 | 2.2 |

*Melting point ~ 170°F.

creased above 100 mole percent there is a trend to lower catalyst activity and a definite increase in the yield of unwanted high molecular weight polyethylene. It seems probable that a practical upper limit will be reached at about 150 mole % HMPA in order to avoid excessive polyethylene yields. Data is also presented to show the effect of pre-adding the HMPA modifier. As in the post-addition case, the HMPA produces a precipitate and increases the olefin product molecular weight. However, comparison of Run 21 (pre-added) and Run 27 (post-added) will show that preaddition is not as effective as post-addition for increasing molecular weight of the olefins and that pre-addition substantially lowers catalyst acitivity. Overall, it would appear that post-addition of HMPA is to be preferred.

As anticipated, the quantity of HMPA-$AlCl_3$ precipitate was observed to increase with increasing HMPA addition. This was true up to roughly 150 mole % HMPA on $TiCl_4$. Beyond that point there was no discernible change in the amount of precipitate. No attempt was made to establish a correlation between the amount of $AlCl_3$ removed by a given HMPA concentration.

EXAMPLE 3

Modifiers other than HMPA which were found to precipitate $AlCl_3$ from the catalyst complex and increase the olefin product molecular weight are listed in Table II. In terms of modifier effect on catalyst activity, wax olefin yield and high molecular weight polymer yield, it can be seen that acetylacetone is perhaps the best of the modifiers cited. It is roughly equivalent to HMPA.

The Table also includes triallylphosphite and diethyl ether, two of many modifiers tested, which did not selectively remove $AlCl_3$ from the catalyst and did not produce the desired increase in olefin product molecular weight.

TABLE II

WAX OLEFIN SYNTHESIS

Diluent: 400 ml of n-heptane
Catalyst (Millimoles): $3 TiCl_4 + 16 AlEtCl_2$ + Modifier as shown
Oligomerization: 35°C., 650 psig ethylene, 1.0 hr.

| Modifier | Mole % Modifier on $TiCl_4$ | Precipitate Obtained | Catalyst Activity g.prod/g. $TiCl_4$/hr | Olefin Product $\bar{M}n$ | Wt.% $C_{30+}$ Wax in Product | Wt.% polyethylene in Product |
|---|---|---|---|---|---|---|
| Triethylene diamine | 33 | yes | 98 | 230 | 38 | 0.4 |
| Dimethylformamide | 100 | yes | 186 | 240 | 41 | 15.7 |
| Ethylene glycoldimethyl ether | 67 | yes | 272 | 255 | 43 | 34.8 |
| Acetylacetone | 100 | yes | 146 | 235 | 39 | 4.8 |
| Acetylacetone | 133 | yes | 126 | 270 | 47 | 4.9 |
| Triallyl phosphite | 100 | no | 98 | 159 | ~22 | 0.0 |
| Diethylether | 33 | no | 40 | 190 | ~25 | 52.0 |

What is claimed is:

1. In a process for preparing a product linear alpha olefins having a number average molecular weight ranging from about 200 to 400, wherein an ethylene-containing gas is polymerized in the presence of a substantially soluble catalyst system formed by mixing components comprising a Group IVB metal compound, said compound having the formula $MX_3A$ wherein M is selected from the group consisting of Ti, Zr and Hf, X is selected from the group consisting of chlorine and bromine and A is selected from the group consisting of chlorine, bromine, and an anion derived from a protonic compound which is an alcohol (R'OH) or a carboxylic acid (R'COOH), R' is selected from the group consisting of alkyl, aryl, aralkyl and cycloalkyl, and an aluminum alkyl compound such that the ultimate formula of the aluminum alkyl compound is $AlR_nX'_{3-n}$, wherein R is selected from the group consisting of alkyl, aralkyl and cycloalkyl and X' is selected from the group consisting of chlorine, bromine, and iodine and $n$ is an integer less than 2, in the presence of a diluent selected from the group consisting of nonpolar aliphatic and naphthenic diluents, and a pressure above 100 psig, wherein the mole ratio of ethylene to the reaction product is maintained above 0.8 mole throughout the reaction and a reaction product is prepared having at least 90 mole percent linear olefins in which the product olefin concentration is greater than 5 weight percent based on the diluent in reaction product, the improvement therewith of adding to the catalytic mixture at least 10 mole percent of a modifier, said modifier being selected from the group consisting of hexamethylphosphoric triamide and dimethyl formamide, based on moles of a Group IVB metal compound, whereby the selectivity of the catalyst is greatly enhanced for the formation of linear alpha olefins of number average molecular weight in the range of 200–400.

2. A process according to claim 1 wherein the modifier is hexamethylphosphoric triamide.

3. A process according to claim 1 wherein said modifier is added in concentrations ranging from 50 to 150 mole percent based on the moles of Group IV metal compound used in forming the catalyst.

4. A process according to claim 1 further including the step of adding the modifier to the catalyst system prior to the introduction of ethylene and filtering off any precipitates resulting from the addition of said modifier to the catalyst prior to carrying out the oligomerization reaction.

5. A process according to claim 1 wherein the reaction is conducted at temperatures ranging from 0°C. to 50°C. at pressures ranging from about 100 psig to 1000 psig.

6. In a process for preparing a product of linear alpha olefins having a number average molecular weight ranging from about 200 to 400, wherein an ethylene-containing gas is polymerized in the presence of a substantially soluble catalyst system formed by mixing a compound, said compound being selected from the group consisting of $TiCl_4$, $TiBr_4$, $ZrCl_4$, $ZrBr_4$, $ZrCl(OEt)_3$, $ZrCl_2(OC_{10}H_{21})_2$, $ZrBr_3OBu$, $Zr(OPr)_4$, $Zr(OBu)_4$, $ZrCl_2(O\phi)_2$, $ZrCl_2(OOCC_9H_{19})_2$, $ZrCl(OOC\phi)_3$, $ZrCl_3OOCCH_3$, $ZrCl_2$ glycoxide, Zr acetyl acetonate, $ZrCl_3$ (O-cyclohexyl), $HfCl_4$, $HfBr_4$ and $Hf(OBu)_4$; with an aluminum alkyl compound such that the ultimate formula of the aluminum alkyl compound is $AlR_nX'_{3-n}$, wherein R is selected from the group consisting of alkyl, aralkyl and cycloalkyl and X' is selected from the group consisting of chlorine, bromine and iodine and $n$ is an integer less than 2, in the presence of a diluent selected from the group consisting of nonpolar aliphatic and naphthenic diluents, and a pressure above 100 psig, wherein the mole ratio of ethylene to the reaction product is maintained above 0.8 mole throughout the reaction and a reaction product is prepared having at least 90 mole percent linear olefins in which the product olefin concentration is greater than 5 weight percent based on the diluent in reaction product, the improvement therewith of adding to the catalytic mixture at least 10 mole percent of a modifier, said modifier being selected from the group consisting of hexamethylphosphoric triamide and dimethyl formamide based on moles of a Group IVB metal compound, whereby the selectivity of the catalyst is greatly enhanced for the formation of linear alpha olefins of number average molecular weight in the range of 200–400.

* * * * *